US 8,947,524 B2

(12) United States Patent
Altwaijry et al.

(10) Patent No.: US 8,947,524 B2
(45) Date of Patent: Feb. 3, 2015

(54) METHOD OF PREDICTING A TRAJECTORY OF AN ASTEROID

(75) Inventors: Haithem Altwaijry, Riyadh (SA);
Khaled Alfozan, Riyadh (SA);
Abdullah Alghalaiqah, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 461 days.

(21) Appl. No.: 13/417,819

(22) Filed: Mar. 12, 2012

(65) Prior Publication Data

US 2012/0229626 A1   Sep. 13, 2012

Related U.S. Application Data

(60) Provisional application No. 61/451,142, filed on Mar. 10, 2011.

(51) Int. Cl.
*H04N 7/18* (2006.01)
*G01S 5/16* (2006.01)

(52) U.S. Cl.
CPC .................................. *G01S 5/16* (2013.01)
USPC ............ 348/135; 348/143; 382/103; 701/513

(58) Field of Classification Search
CPC .... F24J 2/38; G06F 17/30241; G01S 3/7861; G01S 5/16; B64G 1/361; G01J 1/0266
USPC ............. 348/135, 143; 382/103; 701/13, 508, 701/513, 519
See application file for complete search history.

(56) References Cited

U.S. PATENT DOCUMENTS

| 3,185,852 A | 5/1965 | Lewis |
| 3,631,248 A | 12/1971 | Johnson |

(Continued)

FOREIGN PATENT DOCUMENTS

| CN | 102116633 A | 7/2011 |
| WO | 9951495 A2 | 10/1999 |

(Continued)

OTHER PUBLICATIONS

"Asteroid occultations today and tomorrow: toward the GAIA era", Astronomy & Astrophysics manuscript No. occulto'v5 Jan. 17, 2008 by Paolo Tanga et al. (pp. 9) http://arxiv.org/pdf/0801.2684.pdf.

(Continued)

*Primary Examiner* — Sath V Perungavoor
*Assistant Examiner* — Nathnael Aynalem
(74) *Attorney, Agent, or Firm* — Raj Abhyanker, P.C.

(57) ABSTRACT

Disclosed are a system, a method and an apparatus of predicting a trajectory of an asteroid. In one embodiment, a method of predicting a trajectory of an asteroid near a celestial object, includes continuously monitoring, through a high-definition camera optimized for space viewing, an unlimited expanse of space as visible from a location of the high-definition camera optimized for space viewing. The method also includes detecting a change in a light intensity of one of a plurality of stars. In addition, the method includes determining that the light intensity of a star has changed beyond a threshold parameter. The method further includes detecting an occultation, through a discriminating sensor, when the change in the light intensity of the star is determined. On detecting occultation, the method includes recording a set of properties associated with the occultation.

20 Claims, 6 Drawing Sheets

(56) References Cited

U.S. PATENT DOCUMENTS

| | | | |
|---|---|---|---|
| 3,732,424 A | 5/1973 | Wojtulewicz | |
| 3,793,518 A | 2/1974 | Harper | |
| 3,936,629 A | 2/1976 | Desvignes | |
| 4,330,705 A | 5/1982 | Kollodge | |
| 4,453,224 A | 6/1984 | Crooks, Jr. | |
| 4,740,681 A | 4/1988 | Tsuno | |
| 5,512,743 A | 4/1996 | Shaffer et al. | |
| 5,987,363 A | 11/1999 | Quan et al. | |
| 6,057,915 A | 5/2000 | Squire et al. | |
| 6,133,997 A | 10/2000 | Yamawaki et al. | |
| 6,302,354 B1 | 10/2001 | Patera | |
| 6,452,538 B1 | 9/2002 | Hoffman, III | |
| 6,622,970 B2 | 9/2003 | Guo | |
| 6,754,368 B1 | 6/2004 | Cohen | |
| 7,105,791 B1 | 9/2006 | Poller | |
| 7,197,381 B2 | 3/2007 | Sheikh et al. | |
| 7,213,931 B2 | 5/2007 | Strieber | |
| 7,693,702 B1 | 4/2010 | Kerner et al. | |
| 7,831,341 B2 | 11/2010 | Sheikh | |
| 7,982,951 B1 | 7/2011 | Innes et al. | |
| 8,017,895 B2 * | 9/2011 | Moser | 250/203.4 |
| 8,025,002 B2 | 9/2011 | Piccionelli | |
| 8,072,482 B2 | 12/2011 | Gibbs et al. | |
| 8,140,259 B2 | 3/2012 | Hall et al. | |
| 8,446,468 B1 | 5/2013 | Medioni et al. | |
| 8,447,071 B2 | 5/2013 | Ohta | |
| 8,772,690 B2 | 7/2014 | Smith et al. | |
| 8,803,972 B2 | 8/2014 | Kniffen et al. | |
| 2001/0025212 A1 | 9/2001 | Belbruno | |
| 2002/0024599 A1 | 2/2002 | Fukuhara et al. | |
| 2003/0006345 A1 | 1/2003 | Guo | |
| 2003/0202682 A1 | 10/2003 | Yanagisawa et al. | |
| 2005/0077433 A1 | 4/2005 | Schubert | |
| 2007/0204725 A1 | 9/2007 | Strieber | |
| 2007/0283583 A1 | 12/2007 | Subbiondo et al. | |
| 2008/0163504 A1 | 7/2008 | Smith et al. | |
| 2008/0212176 A1 | 9/2008 | Baun et al. | |
| 2010/0002082 A1 | 1/2010 | Buehler et al. | |
| 2010/0038490 A1 | 2/2010 | Hofschuster et al. | |
| 2010/0103251 A1 | 4/2010 | Numako | |
| 2010/0283840 A1 * | 11/2010 | Belenkii et al. | 348/61 |
| 2011/0178756 A1 | 7/2011 | Anderson | |
| 2011/0226907 A1 * | 9/2011 | Robinson | 244/158.4 |
| 2013/0264463 A1 | 10/2013 | Martin et al. | |
| 2013/0278757 A1 | 10/2013 | Martin et al. | |

FOREIGN PATENT DOCUMENTS

| | | |
|---|---|---|
| WO | 0149565 A1 | 7/2001 |
| WO | 2008045014 A2 | 4/2008 |
| WO | 2008074449 A1 | 6/2008 |
| WO | 2012007361 A1 | 1/2012 |
| WO | 2013160901 A2 | 10/2013 |
| WO | 2014121197 A2 | 8/2014 |

OTHER PUBLICATIONS

"Midcourse Space Experiment: Introduction to the Spacecraft, Instruments, and Scientific Objectives", Aerospace Research center, vol. 31, Issue 5 , Sep. 1994 by John D. Mil et al. (pp. 2) http://arc.aiaa.org/doi/abs/10.2514/3.55673.

"Moon Search Algorithms for NASA's Dawn Mission to Asteroid Vesta", NASA Goddard Space Flight Center, Greenbelt, Maryland, USA, Jan. 9, 2013 by Nargess Memarsadeghi et al. (pp. 12) http://arxiv.org/ftp/arxiv/papers/1301/1301.1907.pdf.

"Television ground tracking applied to aerospace and astronomical events", ResearchGate, Jan. 1988 by P.D. Maley (p. 1) http://www.researchgate.net/publication/222743278 Television ground tracking applied to aerospace and astronomical events.

"High Resolution Asteroid Profile by Multi Chord Occultation Observations", International Occultation Timing Association, May 2009 by Scott Degenhardt (pp. 7) http://scottysmightymini.com/PR/HighResAstProfile.pdf.

"Combining asteroid models derived by lightcurve inversion with asteroidal occultation silhouettes", Cornell University Library, Apr. 21, 2011 by Josef Durech et al. (p. 1) http://arxiv.org/abs/1104.4227.

"From Inner Earth To outer Space", Jun. 27, 1997 by Joel Lee Groves et al. (pp. 19) https://www.slb.com/~/media/Files/resources/oilfield_review/ors06/spr06/04_from_inner_to_outer_space.pdf.

* cited by examiner

_US 8,947,524 B2_

METHOD OF PREDICTING A TRAJECTORY OF AN ASTEROID

PRIOR APPLICATIONS

This application claims priority to a provisional application 61/451,142 entitled A METHOD OF PREDICTING A TRAJECTORY OF AN ASTEROID filed on Mar. 10, 2011.

FIELD OF TECHNOLOGY

This disclosure relates generally to a technical field of space research and, in one example embodiment, to a system, method and an apparatus of predicting a trajectory of an asteroid.

BACKGROUND

Earth may be bombarded by asteroids and other near-Earth objects that may drastically impact the Earth. Such collisions may have huge implications for geological, biological and climatalogical development of the Earth and may have similarly severe implications for its inhabitants. Asteroid collisions may be hugely destructive, and may threaten human lives, in addition to impacting valuable energy resources, altering material infrastructure and causing huge financial setbacks. Current technology to monitor space for asteroids may be very expensive and cumbersome, often involving expensive telescopes, and other sophisticated and expensive devices. High cost of the sophisticated equipment, great number of observatories needed, and a number of persons needed to build and operate the observatories make the use of conventional asteroid monitoring technologies prohibitive.

SUMMARY

Disclosed are a system, a method and an apparatus of predicting a trajectory of an asteroid. In one aspect, a method of predicting a trajectory of an asteroid near a celestial object includes continuously monitoring, through a high-definition camera optimized for space viewing, an unlimited expanse of space as visible from a location of the high-definition camera optimized for space viewing. The method also includes detecting a change in a light intensity of one of a plurality of stars. In addition, the method includes determining that the light intensity of a star has changed beyond a threshold parameter. The method further includes detecting an occultation, through a discriminating sensor, when the change in the light intensity of the star is determined. On detecting occultation, the method includes recording a set of properties associated with the occultation. The method also includes positioning a set of high-definition cameras optimized for space viewing throughout the celestial object to observe occultations of the plurality of stars surrounding the celestial object. The method further includes predicting a trajectory of the asteroid causing the occultations based on a set of data gathered from the set of high-definition cameras optimized for space-viewing. The set of data associated with the asteroid causing the occultations may include a speed of the asteroid, a size of the asteroid and/or a distance of the asteroid from the celestial object.

In addition, the method may include aligning the high-definition camera optimized for space viewing to a portion of the unlimited expanse of space as visible from the location of the high-definition camera optimized for space viewing. The method may also include positioning a plurality of high-definition cameras optimized for space-viewing throughout the celestial object to cover a maximum area of the unlimited expanse of space. The set of properties associated with the occultation may include an occultation time, a calculated distance between a particular star and the celestial object, an intensity of the occultation and a brightness of the star.

The method also includes calculating a set of data associated with the asteroid causing the occultation based on information gathered from the set of high-definition cameras optimized for space-viewing. The information gathered from the set of high-definition cameras optimized for space-viewing may include a set of video files captured through the high-definition camera optimized for space-viewing, a set of photographic images captured through the high-definition camera optimized for space-viewing, a set of mathematical values associated with the occultation and the threshold parameter, a set of mathematical values associated with a light intensity and/or a set of recording properties associated with the occultation.

In addition, the method may include positioning the high-definition camera optimized for space viewing at a recording station. The method may also include optimally positioning a set of recording stations throughout the celestial object to cover a maximum area of the unlimited expanse of space. The method may further include communicating the information gathered from the high-definition camera optimized for space-viewing at a particular recording station to a central information-gathering station. The method may also include collecting, and organizing a set of information obtained from multiple recording stations in the central information-gathering station. The method may further include analyzing the set of information obtained from multiple recording stations in the central information-gathering station. The method may also include calculating the set of data associated with the asteroid causing the occultation based on the set of information obtained from multiple recording stations.

In addition, the method may include predicting the trajectory of the asteroid through a vector analysis calculation based on the set of information obtained from multiple recording stations. The method may also include simultaneously detecting and recording occultations of multiple stars at a given recording station. The method may further include positioning multiple recording stations in close proximity to monitor a dense area of an atmosphere. The high-definition camera optimized for space viewing may be placed terrestrially on a fixed location on the celestial object. The high-definition camera optimized for space viewing may be placed in an orbiting satellite floating in space having a predictable trajectory in relation to the celestial object.

In another aspect, a method of estimating a location of an asteroid includes observing a portion of an unlimited expanse of space through a high-definition camera optimized for space viewing at a recording station. The method also includes determining a change in a light intensity emanating from one or more stars, through a discriminating sensor of the high-definition camera optimized for space viewing. In addition, the method includes detecting an occultation when the change in the light intensity emanating from a star is greater than a predetermined threshold parameter. The method also includes positioning a plurality of recording stations at strategic locations throughout a celestial object to cover a maximum area of the unlimited expanse of space. The method further includes calculating a value for a property of the asteroid based on a set of information gathered from the plurality of recording stations.

In yet another aspect, a system of predicting a trajectory of an asteroid includes a high-definition camera optimized for space viewing to monitor a portion of an unlimited expanse of space. In addition, the system includes a discriminating sensor on the high-definition camera optimized for space viewing to detect an occultation when a change in light intensity emanating from one or more stars is greater than a predetermined threshold.

In addition, the system may include a recording station to record a set of information obtained from the high-definition camera and to communicate the set of information to other recording stations. The system may also include a central information-gathering station to collect, analyze and organize that set of information obtained from the recording stations. The system may further include a data processing system at the central information-gathering station to process the set of information obtained from the high-definition camera and to calculate a set of data associated with the asteroid. The set of data associated with the asteroid may include a speed of the asteroid, a size of the asteroid, and a distance between the asteroid and/or a celestial object.

The methods, systems and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

Disclosed are a system, a method and an apparatus of predicting a trajectory of an asteroid. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
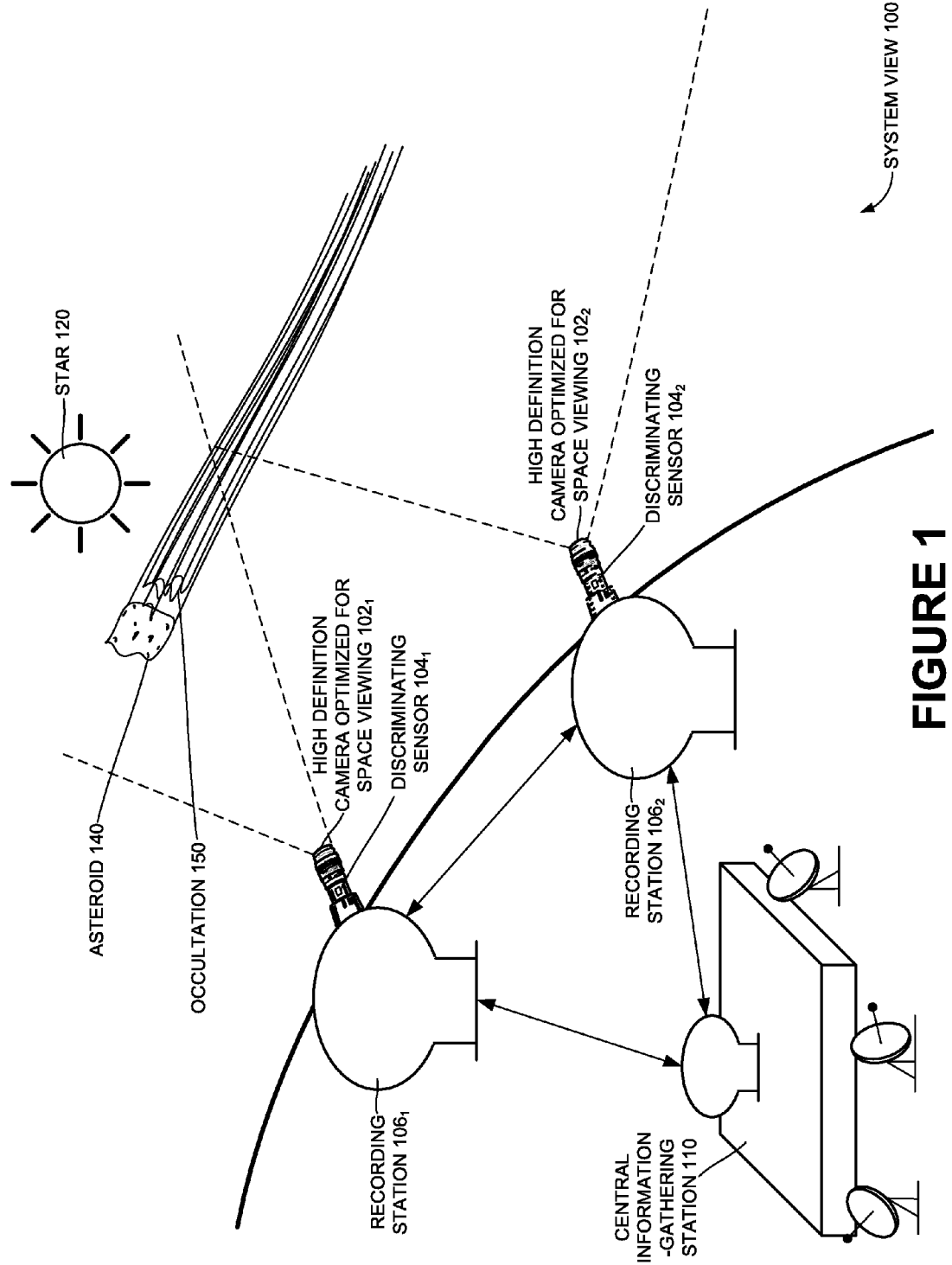
FIG. 1 is a system view illustrating an occultation observation system, according to one or more embodiments.

FIG. 1 is a system view 100 illustrating an occultation observation system, according to one or more embodiments. An occultation may be an event where a celestial object is obscured by an other celestial object (e.g., an asteroid due to the orbital movement of the other celestial object) viewed from a particular point. Eclipses, such as solar eclipse and lunar eclipse, transits and asteroid occultation are some of the examples of the occultations. The asteroid occultation may be an event where an asteroid occults (e.g., covers) a celestial body such as a star. For observers on earth, the asteroid occultation may be an event where an asteroid 140 occults a celestial body such as a star 120 as seen from location of the observer.

In one or more embodiments, asteroid occultation observation may be a study to detect an asteroid and predict a trajectory of the asteroid near a celestial object (e.g., star, Moon). Specifically, occultation observations caused by near-Earth objects (NEO) such as near-Earth asteroids may be performed to detect the objects and asteroids and to determine trajectories of objects and asteroids whose orbits cross through Earth's orbit. Monitoring the movements and trajectories of the near-Earth asteroids is required to track the movements of the near-Earth asteroids as the near-Earth asteroids may be a potential risk for the Earth due to crossing of orbits of the asteroids with the orbit of the Earth. In addition, the orbits of the asteroids may tend to change due to gravitational effect of planets such as earth. Therefore, monitoring and tracking the asteroids may be performed to predict and to determine a risk that can be posed to the Earth due to the movement and orbits of the asteroids that cross the Earth orbit.

In one or more embodiments, high-definition cameras optimized for space viewing $102_{1-N}$ may be used for continuously monitoring events such as occultations 150 in an unlimited expanse of space 260. The high-definition cameras optimized for space viewing $102_{1-N}$ may be positioned to capture events in an unlimited expanse of space 260 as visible from a location; for example, recording stations $106_{1-N}$ where the high-definition camera optimized for space viewing $102_{1-N}$ are placed and aligned. In one or more embodiments, the recording stations $106_{1-N}$ may be observation locations implemented for observing activities in the space 260. There may be 'N' number of recording stations $106_{1-N}$ implemented across globe for detecting and observing occultations. Each of the recording stations $106_{1-N}$ may include one or more high-definition cameras optimized for space viewing. Functions of the recording station may be illustrated in FIG. 4.

In one or more embodiments, the high-definition camera $102_{1-N}$ optimized for space viewing may be positioned and aligned in each of the recording stations such that each of the high-definition cameras $102_{1-N}$ may be optimized for viewing a predefined portion of the unlimited expanse of space 260 as visible from the respective location of the recording station. In one or more embodiments, the high-definition cameras $102_{1-N}$ may also be placed and positioned in locations other than Earth, for example, Moon for observing activities such as occultations in space 260. Also, in one or more embodiments, the high-definition camera optimized for space viewing $102_{1-N}$ may be placed terrestrially on a fixed location on a celestial object such as a Moon. In one or more embodiments, the high-definition cameras optimized for space viewing $102_{1-N}$ may also be placed in an orbiting satellite (e.g., man-made satellite) floating in space having a predictable trajectory in relation to the celestial object.

In one or more embodiments, each the high-definition cameras $102_{1-N}$ may be positioned to observe a portion of unlimited expanse of space 260. However, the high-definition cameras $102_{1-N}$ may also be configured to focus on a particular portion of unlimited expanse of space 260 when required. In one or more embodiments, the high-definition cameras optimized for space viewing $102_{1-N}$ may also be positioned throughout a celestial object to observe occultations of one or more stars surrounding the celestial object. In one or more embodiments, the high-definition cameras $102_{1-N}$ may be so positioned to enable viewing throughout the celestial object to cover a maximum area of the unlimited expanse of space 260.

Figure 2A:
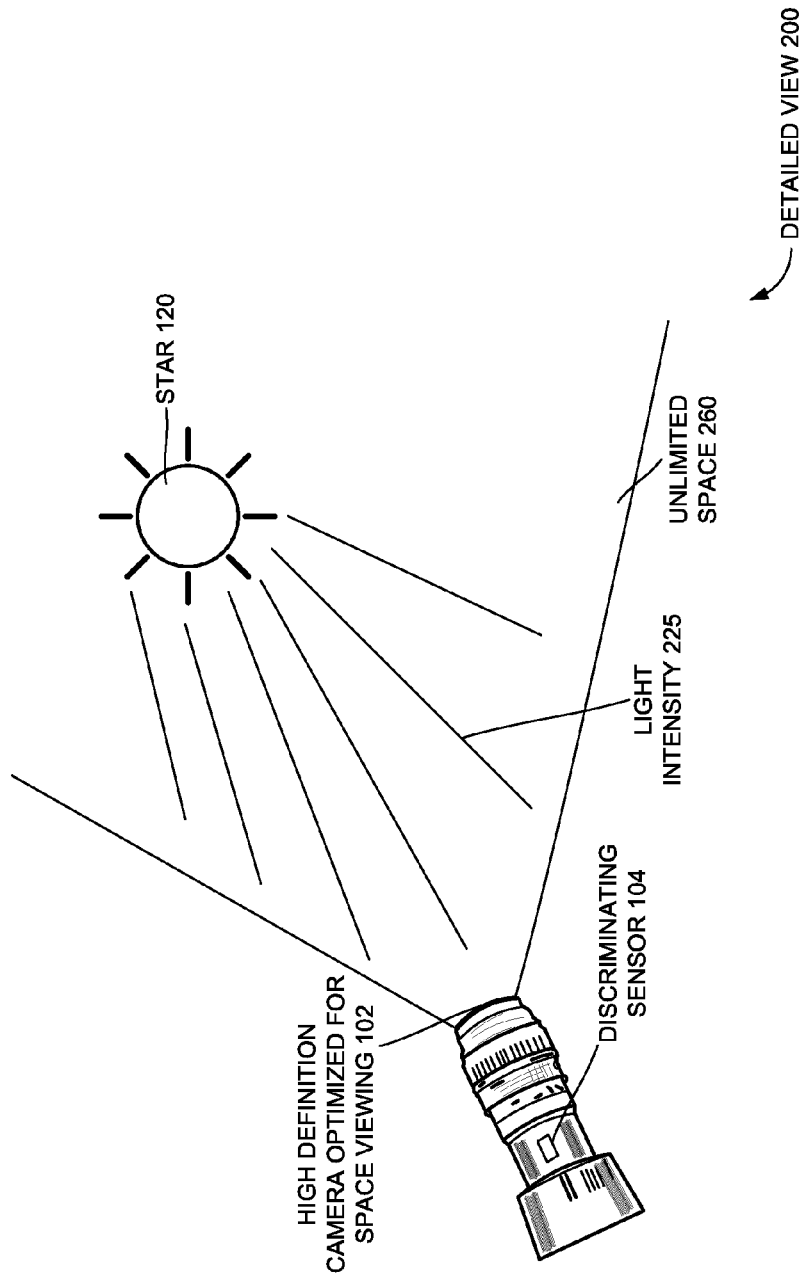
FIG. 2A is a detailed view illustrating observation of a celestial object, according to one or more embodiments.
Figure 2B:
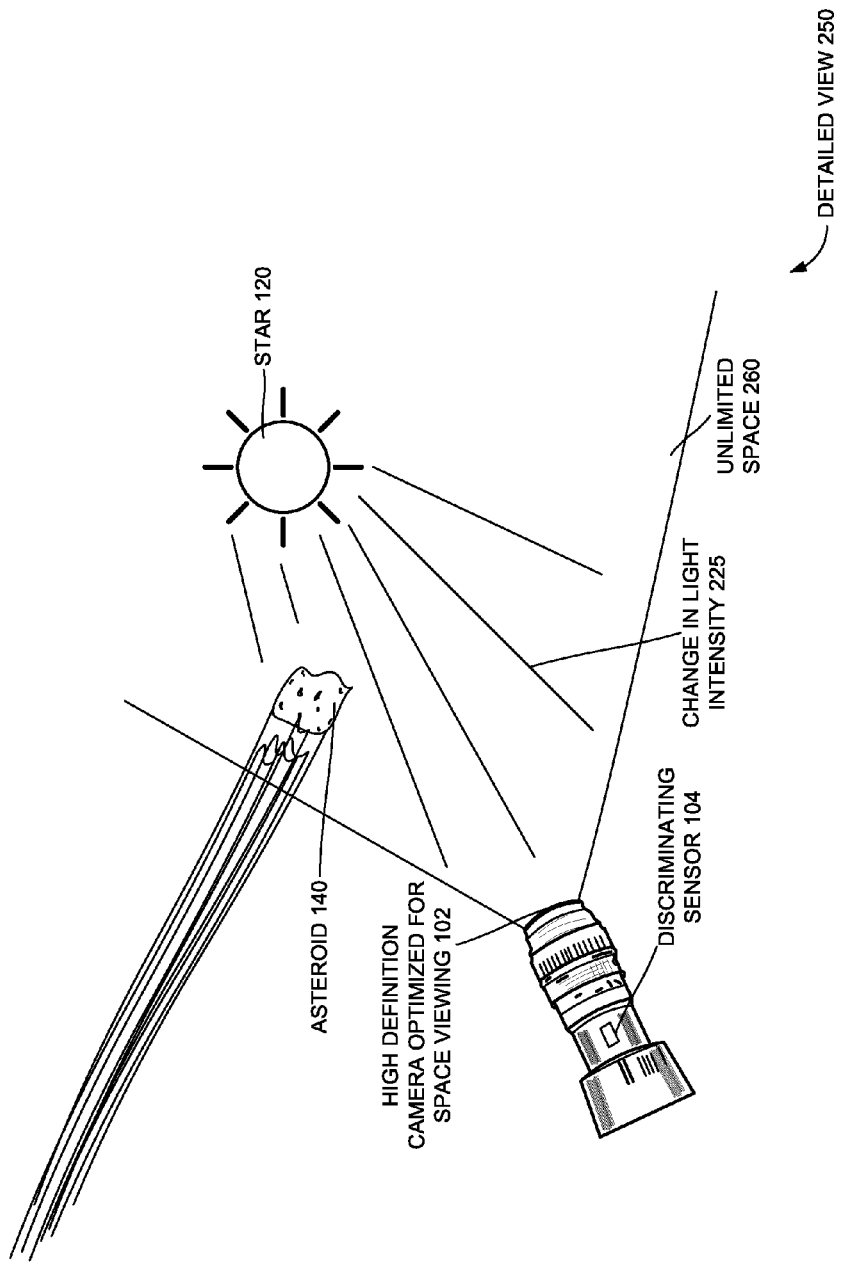
FIG. 2B is a detailed view illustrating an occultation, according to one or more embodiments.

In one or more embodiments, the high-definition cameras $102_{1-N}$ may be configured to detect and record activities occurring in the unlimited expanse of space 260. In one or more embodiments, the high-definition cameras $102_{1-N}$ optimized for space viewing are configured to detect one or more occultations within a portion of unlimited expanse of space 260 caused by one or more asteroids. In one or more embodiments, each of the high-definition cameras optimized for space viewing $102_{1-N}$ may include a discriminating sensor $104_{1-N}$ to detect an occultation 150. Occultation may include but not be limited to eclipses, transits, and asteroid based occultation. However, asteroid based occultations may be very sensitive (e.g., due to size of the asteroid) and hard to detect as the occultation may occur in a very less amount of time with negligible change in light intensity. Occultation 150 may occur when an asteroid 140 moves in its trajectory occulting a celestial object such as the star 120 (e.g., as illustrated in FIG. 1 and FIG. 2B). In one or more embodiments, the occultation 150 may be detected based on change in light intensity 225. In one or more embodiments, the change in intensity of the light 225 emanating from a celestial body such as the star 120 may be detected due to occultation 150 caused due by the asteroid 140, through the discriminating sensor 104 of the high-definition cameras optimized for space viewing $102_{1-N}$. In one or more embodiments, the discriminating sensor 104 may be a light sensor implemented as a part of design of the high-definition cameras for space viewing $102_{1-N}$. In one or more embodiments, any slight change in light intensity 225 emanated from the celestial body may be detected by the discriminating sensor 104.

Furthermore, the change in the light intensity 225 may be measured by the discriminating sensor 104. If the change in the light intensity 225 is greater a threshold parameter, then an occultation event 150 may be captured using the high-definition camera optimized for space viewing $102_{1-N}$. In one or more embodiments, the occultation event 150 may be completely recorded. In one or more embodiments, the occultation event 150 may be recorded by one high-definition camera or more than one definition camera. Based on possible chances of viewing asteroid occultation from more than one location (e.g., recording stations at a shadow path of the asteroid), more high-definition cameras situated in the shadow paths may be configured and aligned to captured the occultation event 150.

In one or more embodiments, a set of properties associated with the occultation and information associated with the occultation may be recorded using the high-definition cameras optimized for space viewing $102_{1-N}$ positioned in the recording station $106_{1-N}$, a celestial object and/or an orbiting satellite. In one or more embodiments, the set of properties associated with the occultation may be an occultation time, a calculated distance between a particular star and the celestial object, an intensity of the occultation and a brightness of the star.

The orbiting satellite and the celestial object where the high-definition cameras are positioned may also be termed as recording stations as the high-definition cameras are coupled to recording station modules to communicate captured event to the central information-gathering station. In one or more embodiments, the information gathered from the set of high-definition cameras optimized for space-viewing $102_{1-N}$ may include but not limited to a set of video files captured through the high-definition camera optimized for space-viewing $102_{1-N}$, a set of photographic images captured through the high-definition camera optimized for space-viewing $102_{1-N}$, a set of mathematical values associated with the occultation 150 and the threshold parameter, a set of mathematical values associated with the light intensity 225 and the set of recording properties associated with the occultation 150.

Also, in one or more embodiments, the high-definition cameras $102_{1-N}$ may be configured such that more than one occultation may be detected and recorded. In other words, simultaneously occurring occultations of stars caused due to the asteroids may be detected and recorded at a given recording station. In one or more embodiments, the recordings, information collected from the recording station(s) $106_{1-N}$ may be communicated to a central information-gathering station 110. In one or more embodiments, the communication may be enabled through a network. In one or more embodiments, the network may be a public network or a private network such as a Virtual Private Network (VPN).

In one or more embodiments, the central information-gathering station 110 may be a processing station that is configured to collect and organize the set of properties and the information associated with the occultation 150 communicated by each of the recording stations $106_{1-N}$, the orbiting satellites and/or the celestial objects to determine movement of asteroids and the trajectory of each of the asteroids. In addition, in one or more embodiments, the information that includes video, images, etc. may be processed in the central information-gathering station 110.

In one or more embodiments, the central information-gathering station 110 may include a server that gathers occultation information communicated from the high-definition cameras $102_{1-N}$ positioned from various recording stations $106_{1-N}$, orbiting satellites and/or the celestial objects. Also, in one or more embodiments, the central information-gathering station 110 may include a database managed by a database management system to store and record every occultation event with details and the information obtained from each of the high-definition cameras $102_{1-N}$ for reference.

Furthermore, in one or more embodiments, the central information-gathering station 110 may have data processing systems such as computers to perform processing. In one or more embodiments, processing may include image processing, video processing, identifying an asteroid (e.g., name), calculation of trajectory, comparison with previous records of the asteroid, deviation, errors, etc. Furthermore, the central information-gathering station 110 may also include computing systems for performing computing operations such as identification of the asteroid, calculating trajectory based on previous data and obtained information, updating the records with new information discovered from the event, etc. In one or more embodiments, the computing systems may be optimized for performing complex operations (e.g., simulations, large calculations, parallel processing) as well as simple operations (e.g., identification of the asteroid, updating records, updating information in the database). The central information-gathering station 110 may be further explained in FIG. 5.

Furthermore, the set of data associated with the asteroid causing the occultations may be calculated based on the set of information obtained from multiple recording stations $106_{1-N}$. In one or more embodiments, the set of data associated with the asteroid causing the occultations may include but not be limited to a speed of the asteroid, a size of the asteroid, and a distance of the asteroid from the celestial object.

In one or more embodiments, a trajectory of the asteroid causing the occultations may be predicted based on the set of data obtained from the information gathered from the set of high-definition cameras optimized for space-viewing $102_{1-N}$. Also, in one or more embodiments, prediction of the trajectory of the asteroid may be performed through a vector analysis calculation based on the set of information obtained from the high-definition camera $102_{1-N}$ positioned in the multiple recording stations $106_{1-N}$, the orbiting satellite and the celestial objects. In one or more embodiments, the properties associated with the occultation includes but not limited to an occultation time, a calculated distance between a particular star and the celestial object, an intensity of the occultation and a brightness of the star.

Figure 3:
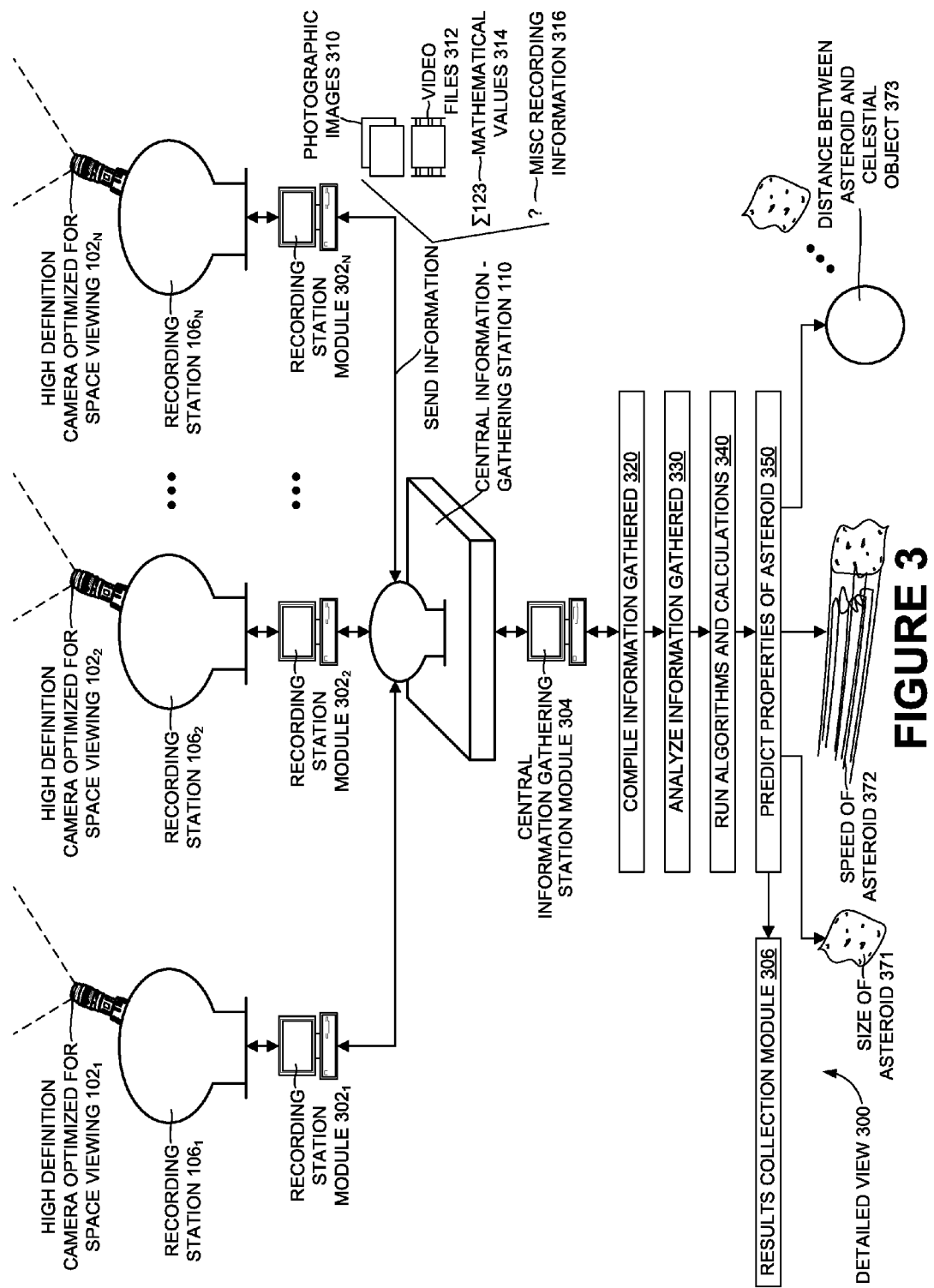
FIG. 3 is a detailed view illustrating functions of occultation observation system, according to one or more embodiments.

FIG. 3 is a detailed view 300 illustrating functions of occultation observation system, according to one or more embodiments. In one or more embodiments, events occurring in space such as occultations captured and recorded by the high-definition cameras optimized for space viewing $102_{1-N}$ positioned in the recording stations $106_{1-N}$, orbiting satellites, and/or the celestial objects may be communicated to the central information-gathering station 110. In one or more embodiments, the recording station module $302_{1-N}$ may be a set of hardwares supported by softwares to record the events, communicate the recorded events to the central information-gathering station 110 and to align the high-definition camera as controlled from the central information-gathering station 110. In one or more embodiments, the events may include an occultation event where a star may be occulted by an asteroid. In one or more embodiments, the event that is recorded may include, but not limited to photographic images 310, a video recording 312, a mathematical value 314, and a miscellaneous recording information 316. The photographic images 310 may include images taken throughout the event, the video recording 312 may be the complete recording activity of the event, a mathematical value 314 may include approximate distance, etc. and the miscellaneous recording information 316 may include other information such as time of event, recording station location (e.g., coordinates), etc.

In one or more embodiments, the central information-gathering station 110 may include the central information-gathering station module 304 that collects recordings from all the recording station modules $302_{1-N}$. In one or more embodiments, the central information-gathering station module 304 may be the server that coordinates the collection of recordings from all the recording station modules $302_{1-N}$. Furthermore, the central information-gathering station module 304 may perform following operations: compiling information gathered from the recordings 320, analyzing the information gathered from the recordings 330, running algorithms and calculations to generate a set of data and predicting properties of asteroids 350 such as a size of asteroid 317, a speed of the asteroid 372, a distance between the asteroid and the celestial object 373, the name of the asteroid if the details of the asteroid is found in the database records earlier, etc. Furthermore, the generated set of data, tabulated results, and other results may be collected, organized, and stored in the database using a result collection module 306.

Figure 4:
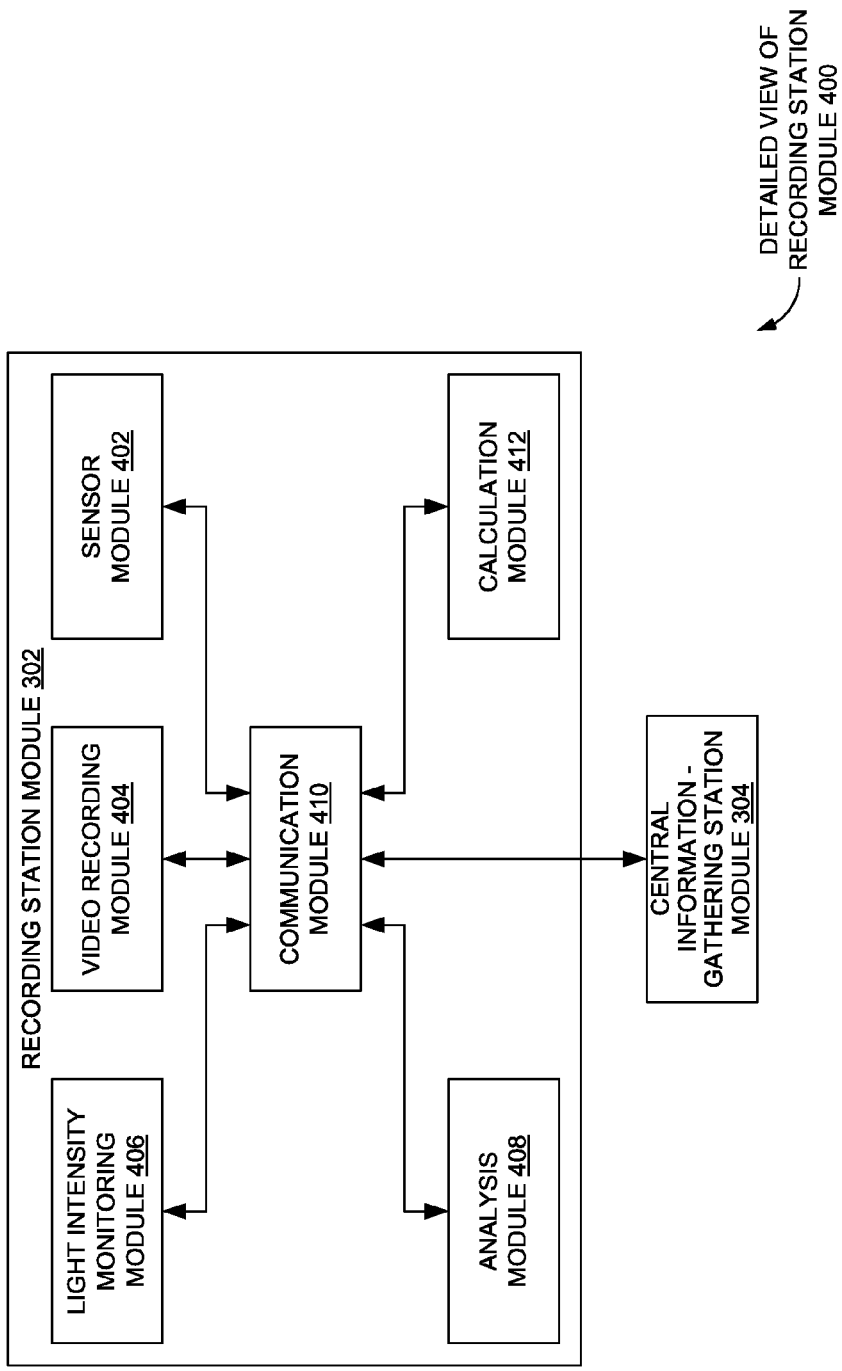
FIG. 4 is a detailed view of a recording station module, according to one or more embodiments.

FIG. 4 is a detailed view 400 of a recording station module 302, according to one or more embodiments. The recording station module 302 may include a sensor module 402, a video recording module 404, a light intensity monitoring module 406, an analysis module 408, a communication module 410 and a calculation module 412, according to one or more embodiments. In one or more embodiments, the sensor module 402 may be implemented to detect any change in intensity of light. In one or more embodiments, the sensor module 402 may include a light sensor. In one example embodiment, the sensor module 402 may be the discriminating sensor as described in FIG. 1. The change in light intensity may be measured by the light intensity monitoring module 406. If the change in light intensity exceeds a threshold value, then the occultation event may be recorded. In one embodiment, the occultation event may be recorded using the video recording module 404. The video recording module 404 may capture the occultation event in a form of video and images. In one or more embodiments, the video recording module 404 may be enabled through the high-definition cameras as illustrated in FIGS. 1-4.

In one or more embodiments, the analysis module 408 may analyze event related data. The event related data may include but not limited to time of event, coordinate information, approximate size of the asteroid, etc. In one or more embodiments, calculations required for analysis in the analysis module 408 may be performed in the calculation module 412 of the recording station module 302. Furthermore, the recordings, the information associated with the occultation event may be communicated to the central information-gathering station module 304 through the communication module 410. In one or more embodiments, the communication module 410 may be configured using communication protocols for enabling communication of recordings and information associated with the occultation event to the central information-gathering station module 304. Furthermore, the communication may be performed through a public network or through a private network.

Figure 5:
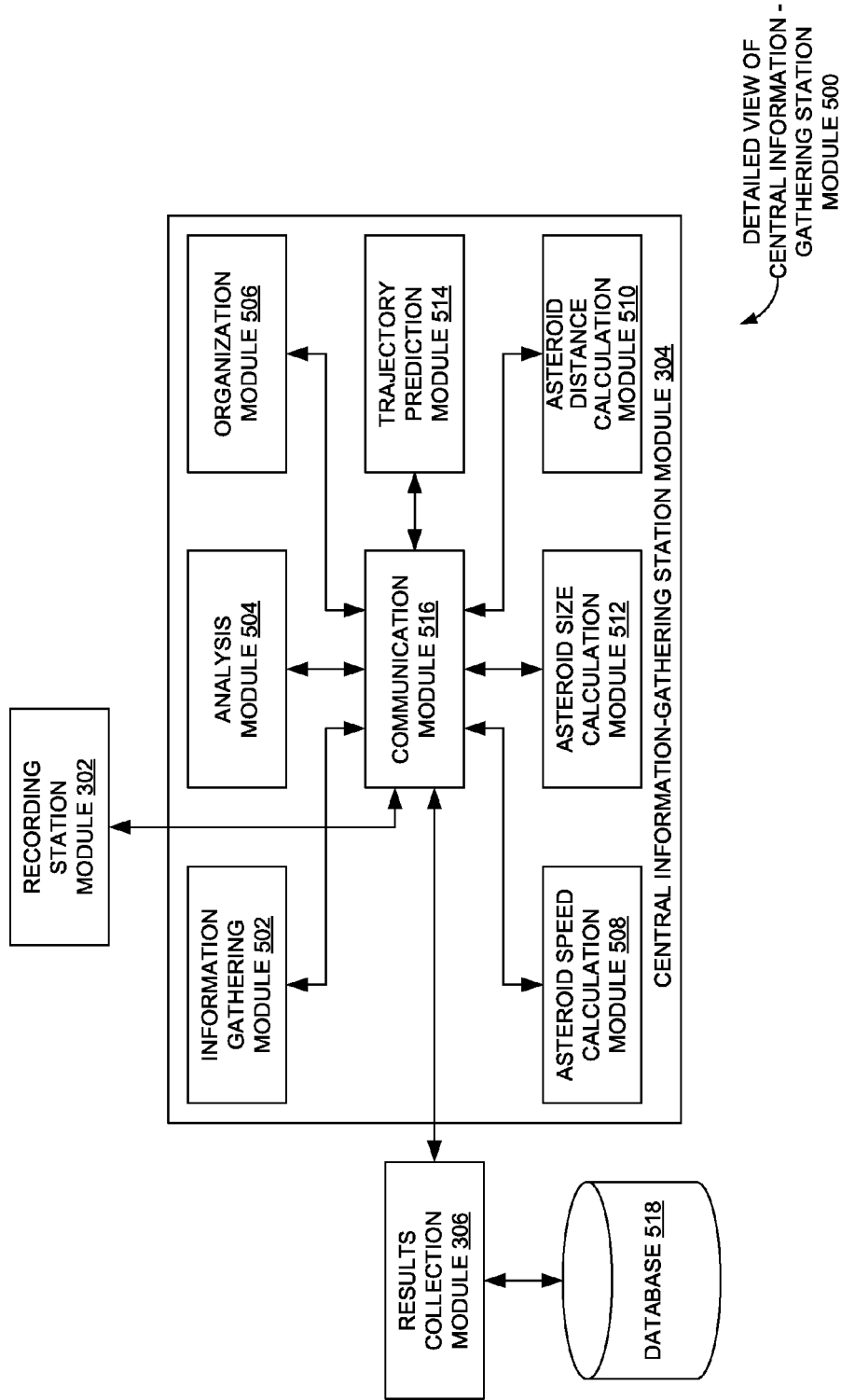
FIG. 5 is a detailed view of a central information-gathering station module 304, according to one or more embodiments.

FIG. 5 is a detailed view 500 of the central information-gathering station module 304, according to one or more embodiments. In particular, the central information-gathering station module 304 may include an information gathering module 502, an analysis module 504, an organization module 506, an asteroid speed calculation module 508, communication module 516, an asteroid distance calculation module 510, an asteroid size calculation module 512, and a trajectory prediction module 514, according to one or more embodiments.

The communication module 516 of the central information-gathering station module 304 may be configured to receive the information and recordings communicated by the communication module 410 of the recording station module 302. In addition, in one or more embodiments, the communication module 516 may be configured to communicate control commands to the recording station module 302 through the communication module 410 of the recording station module 302. The information gathering module 502 may be configured to gather information and recording obtained by the communication module 516. The gathered information and recordings may be organized through an organization module 506. In one or more embodiments, the organized recordings and the information associated with the may be analyzed through the analysis module 504. The recordings and the information may be analyzed to obtain refined information. For example, the images may be analyzed using image processing software to obtain details of size, shape, etc. Similarly, the video recordings may be analyzed to obtain information about the event with respect to time. The recordings and information may be analyzed using various algorithms. Furthermore, it may be determined whether the asteroid that is detected existed in the records or whether it is a new asteroid. Furthermore, additional information such as name of the asteroid if it existed in records, etc. may be obtained and appended as a metadata to the record.

Furthermore, through the asteroid size calculation module 512 the size of the asteroid may be determined. Also, in one or more embodiments, the trajectory of the asteroid may be predicted through the trajectory prediction module 514 based on the analysis of the asteroid and its path. In one or more embodiments, previous data associated with the asteroid found in the database 518 may be used by the trajectory prediction module 514 for predicting the trajectory of the asteroid. Also, in one or more embodiments, a vector analysis calculation may be performed to determined trajectory of the asteroid.

In one or more embodiments, with reference to the celestial object such as a moon, the distance of the asteroid from the celestial object may be calculated through the asteroid distance calculation module 510. The generated results may be communicated to the result collection module 306 through the communication module 516. The result collection module 306 may be configured to organize the results and store the results along with recording to the database 518 provided thereof.

In one or more embodiments, the asteroid 140 may be identified; the trajectory of the asteroid may be derived and compared with the records associated with the asteroid stored in the database. Furthermore, the occultation event 150 caused by the asteroid 140 may also be stored in the database. Furthermore, possibilities of future occultations that may be caused due to the asteroid 140 may be calculated using suitable algorithms and an alert may be generated.

Also, in one or more embodiments, the recording stations $106_{1-N}$ may be controlled through the central information-gathering station 110. For example, the high-definition cameras of different recording stations may be re-aligned or repositioned for capturing a particular event in space when required to obtain more information on a particular occultation. Also, in one or more embodiments, a high-definition camera may be configured to track a movement of an asteroid by continuously aligning and positioning to continuously viewing and recording the asteroid for a particular amount of time. The embodiments described herein provides an inexpensive and a non-complicated method to track and gather relevant information of near earth objects such as asteroids that may pose a threat to earth due to the orbit of the asteroid that may intersect the Earth's orbit. Also, the embodiment as described herein provides a highly sophisticated system to create and maintain a database of occultation and NEO detection.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, various electrical structures and methods may be embodied using transistors, logic gates, and electrical circuits. Accordingly, the specification and drawings are to be regarded in an illustrative rather than a restrictive sense.

What is claimed:

1. A method of predicting a trajectory of an asteroid near a celestial object, comprising:
   continuously monitoring, through a high-definition camera optimized for space viewing, an unlimited expanse of space as visible from a location of the high-definition camera optimized for space viewing;
   detecting a change in a light intensity of one of a plurality of stars;
   determining that the light intensity of a star has changed beyond a threshold parameter;
   detecting an occultation, through a discriminating sensor, when the change in the light intensity of the star is determined;
   recording a set of properties associated with the occultation;
   positioning a set of high-definition cameras optimized for space viewing throughout the celestial object to observe occultations of the plurality of stars surrounding the celestial object; and
   predicting a trajectory of the asteroid causing the occultations based on a set of data gathered from the set of high-definition cameras optimized for space-viewing.

2. The method of claim 1 further comprising:
   aligning the high-definition camera optimized for space viewing to a portion of the unlimited expanse of space as visible from the location of the high-definition camera optimized for space viewing; and
   positioning a plurality of high-definition cameras optimized for space-viewing throughout the celestial object to cover a maximum area of the unlimited expanse of space.

3. The method of claim 2 wherein the set of properties associated with the occultation is at least one of an occultation time, a calculated distance between a particular star and the celestial object, an intensity of the occultation and a brightness of the star.

4. The method of claim 3 further comprising:
   calculating a set of data associated with the asteroid causing the occultation based on information gathered from the set of high-definition cameras optimized for space-viewing,
   wherein the information gathered from the set of high-definition cameras optimized for space-viewing is at least one of a set of video files captured through the high-definition camera optimized for space-viewing, a set of photographic images captured through the high-definition camera optimized for space-viewing, a set of mathematical values associated with the occultation and the threshold parameter, a set of mathematical values associated with a light intensity and a set of recording properties associated with the occultation, and
   wherein the set of data associated with the asteroid causing the occultations is at least one of a speed of the asteroid, a size of the asteroid and a distance of the asteroid from the celestial object.

5. The method of claim 4 further comprising:
positioning the high-definition camera optimized for space viewing at a recording station;
optimally positioning a set of recording stations throughout the celestial object to cover a maximum area of the unlimited expanse of space; and
communicating the information gathered from the high-definition camera optimized for space-viewing at a particular recording station to a central information-gathering station.

6. The method of claim 5 further comprising:
automatically communicating the information gathered from the high-definition camera optimized for space viewing to the central information-gathering station;
collecting, and organizing a set of information obtained from multiple recording stations in the central information-gathering station;
analyzing the set of information obtained from multiple recording stations in the central information-gathering station; and calculating the set of data associated with the asteroid causing the occultation based on the set of information obtained from multiple recording stations.

7. The method of claim 6 further comprising:
predicting the trajectory of the asteroid through a vector analysis calculation based on the set of information obtained from multiple recording stations.

8. The method of claim 7 further comprising:
simultaneously detecting and recording occultations of multiple stars at a given recording station.

9. The method of claim 8 further comprising:
positioning multiple recording stations in close proximity to monitor a dense area of an atmosphere.

10. The method of claim 9 wherein the high-definition camera optimized for space viewing is placed terrestrially on a fixed location on the celestial object.

11. The method of claim 10 wherein the high-definition camera optimized for space viewing is placed in an orbiting satellite floating in space having a predictable trajectory in relation to the celestial object.

12. A method of estimating a location of an asteroid, comprising:
observing a portion of an unlimited expanse of space through a high-definition camera optimized for space viewing at a recording station;
determining a change in a light intensity emanating from at least one of a plurality of stars, through a discriminating sensor of the high-definition camera optimized for space viewing;
detecting an occultation when the change in the light intensity emanating from a star is greater than a predetermined threshold parameter;
positioning a plurality of recording stations at strategic locations throughout a celestial object to cover a maximum area of the unlimited expanse of space; and
calculating a value for a property of the asteroid based on a set of information gathered from the plurality of recording stations.

13. The method of claim 12 further comprising:
recording a set of values associated with the asteroid at the recording station,
wherein, the set of values associated with the asteroid is at least one of an occultation time, a calculated distance between the particular star and the celestial object, an intensity of the occultation and a brightness of the star.

14. The method of claim 13 further comprising:
automatically communicating a set of information obtained at a particular recording station to a central information-gathering station;
collecting, and organizing the set of information obtained from the plurality of recording stations in the central information-gathering station;
analyzing the set of information obtained from the plurality of recording stations in the central information-gathering station; and
calculating values for a set of properties associated with the asteroid based on the set of information obtained from the plurality of recording stations.

15. The method of claim 12 wherein the set of information obtained at a particular recording station is at least one of a set of video files captured through the high-definition camera optimized for space-viewing, a set of photographic images captured through the high-definition camera optimized for space-viewing, a set of mathematical values associated with the occultation and the threshold parameter, a set of mathematical values associated with a light intensity and a set of recording properties associated with the occultation.

16. The method of claim 12 wherein the set of properties associated with the asteroid is at least one of a speed of the asteroid, a size of the asteroid and a distance of the asteroid from the celestial object.

17. A system of predicting a trajectory of an asteroid comprising:
a high-definition camera optimized for space viewing to monitor a portion of an unlimited expanse of space; and
a discriminating sensor on the high-definition camera optimized for space viewing to detect an occultation when a change in light intensity emanating from at least one of a plurality of stars is greater than a predetermined threshold.

18. The system of claim 17 further comprising:
a recording station to record a set of information obtained from the high-definition camera and to communicate the set of information to other recording stations.

19. The system of claim 18 further comprising:
a central information-gathering station to collect, analyze and organize that set of information obtained from the recording stations.

20. The system of claim 19 further comprising:
a data processing system at the central information-gathering station to process the set of information obtained from the high-definition camera and to calculate a set of data associated with the asteroid,
wherein the set of data associated with the asteroid is at least one of a speed of the asteroid, a size of the asteroid, and a distance between the asteroid and a celestial object.

* * * * *